(12) United States Patent
Seger et al.

(10) Patent No.: US 10,015,179 B2
(45) Date of Patent: *Jul. 3, 2018

(54) INTERROGATING MALWARE

(71) Applicant: Palo Alto Networks, Inc., Santa Clara, CA (US)

(72) Inventors: Robert Seger, Sunnyvale, CA (US); Vishaal Hariprasad, Mountain View, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 36 days.

This patent is subject to a terminal disclaimer.

(21) Appl. No.: 15/195,397

(22) Filed: Jun. 28, 2016

(65) Prior Publication Data

US 2016/0308893 A1 Oct. 20, 2016

Related U.S. Application Data

(63) Continuation of application No. 13/914,368, filed on Jun. 10, 2013, now Pat. No. 9,419,985.

(60) Provisional application No. 61/705,569, filed on Sep. 25, 2012.

(51) Int. Cl.
*G06F 11/00* (2006.01)
*H04L 29/06* (2006.01)

(52) U.S. Cl.
CPC .......... *H04L 63/1416* (2013.01); *H04L 63/14* (2013.01); *H04L 63/145* (2013.01); *H04L 63/1433* (2013.01)

(58) Field of Classification Search
None
See application file for complete search history.

(56) References Cited

U.S. PATENT DOCUMENTS

| | | | | |
|---|---|---|---|---|
| 7,673,342 B2 * | 3/2010 | Hursey | ............... | G06Q 10/107 709/206 |
| 7,693,092 B2 * | 4/2010 | Nishi | ..................... | H04L 41/00 370/225 |
| 7,801,840 B2 * | 9/2010 | Repasi | .................. | G06F 21/577 706/52 |
| 8,854,984 B1 * | 10/2014 | Li | .......................... | H04L 43/50 370/242 |
| 8,903,920 B1 * | 12/2014 | Hodgson | ........... | H04L 29/06176 379/93.01 |
| 2004/0039938 A1 * | 2/2004 | Katz | ................... | H04L 63/1458 726/2 |
| 2006/0272025 A1 * | 11/2006 | Mononen | ............... | H04L 47/24 726/26 |

(Continued)

OTHER PUBLICATIONS

Jordan et al., Network Malware Capture, IEEE, 2009, 4 pages.*

(Continued)

*Primary Examiner* — Jeffrey C Pwu
*Assistant Examiner* — Baotram Tran
(74) *Attorney, Agent, or Firm* — Van Pelt, Yi & James LLP

(57) ABSTRACT

Identifying a behavior of a malware service is disclosed. An interrogation packet is sent to a network communication port of a receiver. The interrogation packet is one of a plurality of predetermined interrogation packets sent to the network communication port. The interrogation packet invites an expected action. The expected action is detected. It is determined that the malware service is potentially is operating.

32 Claims, 7 Drawing Sheets

(56) References Cited

U.S. PATENT DOCUMENTS

| | | | | |
|---|---|---|---|---|
| 2007/0240217 | A1* | 10/2007 | Tuvell | G06F 21/56 726/24 |
| 2007/0288303 | A1* | 12/2007 | Weaver | G06Q 30/02 709/201 |
| 2008/0019352 | A1* | 1/2008 | Bennett | G06F 21/562 370/352 |
| 2008/0056487 | A1* | 3/2008 | Akyol | H04L 63/0428 380/2 |
| 2008/0148379 | A1* | 6/2008 | Xu | H04L 29/125 726/11 |
| 2009/0222920 | A1* | 9/2009 | Chow | G06F 21/566 726/23 |
| 2010/0031358 | A1* | 2/2010 | Elovici | H04L 41/147 726/24 |
| 2011/0047597 | A1* | 2/2011 | Mahaffey | G06F 21/564 726/3 |
| 2011/0131466 | A1* | 6/2011 | Lamy-Bergot | H04L 1/004 714/758 |
| 2011/0224954 | A1* | 9/2011 | Jayasundara | G06F 17/5009 703/1 |
| 2012/0174227 | A1* | 7/2012 | Mashevsky | G06F 21/562 726/24 |
| 2012/0256728 | A1* | 10/2012 | Bajic | G06K 7/10019 340/10.1 |
| 2013/0014263 | A1* | 1/2013 | Porcello | H04L 63/0272 726/25 |
| 2013/0051222 | A1* | 2/2013 | Gavrilov | H04L 41/0668 370/225 |
| 2013/0117437 | A1* | 5/2013 | Tseng | H04L 69/163 709/224 |
| 2014/0200041 | A1* | 7/2014 | Juntunen | H04L 43/50 455/466 |

OTHER PUBLICATIONS

Rathgeb et al., The E-Mail Honeypot System-Concept, Implementation and Field Test Results, IEEE, 2008, 6 pages.*

Xie et al., pBMDS: A Behavior-based Malware Detection System for Cellphone Devices, ACM, 2010, 12 pages.*

Bose et al., Behavioral Detection of Malware on Mobile Handsets, ACM, 2008, 14 pages.*

Gates et al., Scan Detection on Very Large Networks Using Logistic Regresssion Modeling, IEEE, 2006, 6 pages.*

Talukder et al., Artificial Hygiene: A Critical Step towards Safety from Email Viruses, IEEE, 2004, 6 pages.*

Zeeuwen et al., Improving Malicious URL Re-Evaluation Scheduling Through an Empirical Study of Malware Download Centers, ACM, 2011, 8 pages.*

* cited by examiner

INTERROGATING MALWARE

CROSS REFERENCE TO OTHER APPLICATIONS

This application is a continuation of U.S. patent application Ser. No. 13/914,368 entitled INTERROGATING MALWARE filed Jun. 10, 2013, now U.S. Pat. No. 9,419,985, which claims priority to U.S. Provisional Patent Application No. 61/705,569 entitled SYSTEMS, METHODS, AND COMPUTER PROGRAM PRODUCTS FOR ACTIVE HUNTING OF MALWARE IMPLANTS filed Sep. 25, 2012, both of which are incorporated herein by reference for all purposes.

BACKGROUND OF THE INVENTION

Corporations, government agencies, and personal users are suffering from wholesale data exfiltration, privacy breaches, and system downtime due to attacks from malicious software, or malware. Networks often utilize a layered defense to malware attacks, which includes antivirus software, firewalls, and intrusion protection systems. Malware implants are often stored in a computer system without the knowledge or consent of the operator of the computer system. The majority of current network security solutions detect malware using heuristic signature-based detection. Signature-based detection consists of searching for known patterns of data in storage. Since signature-based detection systems focus on specific malware characteristics for discovery, such systems often require constant scanning of large amounts of data. Additionally, it is difficult for traditional signature-based detection systems to detect new malware that has not been analyzed and stored in a signature database. In some cases, a malware may lie dormant until it is remotely activated (e.g., to transmit data of the infected host to a remote location). A traditional malware detection system may be able to only detect the dormant malware only after it becomes active in memory and causes damage. Therefore, there exists a need for improved malware detection.

BRIEF DESCRIPTION OF THE DRAWINGS

Various embodiments of the invention are disclosed in the following detailed description and the accompanying drawings.

DETAILED DESCRIPTION

Figure 1:
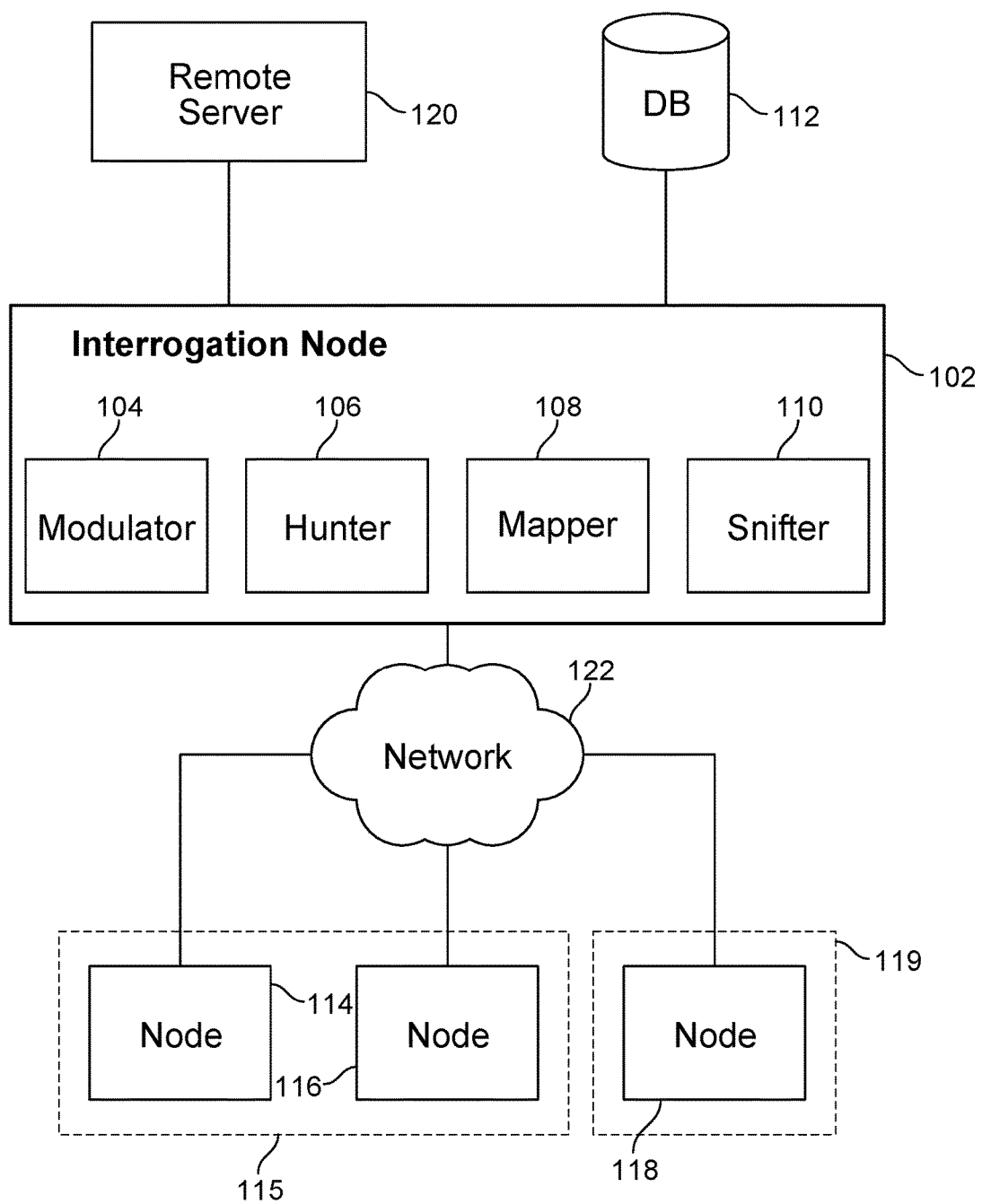
FIG. 1 is a block diagram illustrating an embodiment of a network environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Identifying a behavior of a network/application service operating on one or more ports of a network node is disclosed. For example, a behavior or a service (e.g., malware behavior/service) of a network node is discovered. In some embodiments, a plurality of predetermined interrogation packets that correspond to a plurality of hypotheses is sent. Each hypothesis corresponds to a potential behavior and/or network/application service (e.g., malware behavior/service) that may be operating on a port of a network node, and a predetermined interrogation packet invites an expected action that confirms the operation of a particular behavior/service being tested with the associated hypothesis. For example, ports of a device on a network have been scanned to determine which ports of the device are operating a listening service. In order to determine which exact service or a behavior of the listening service is operating on the port, a hypothesis is determined on which exact service and/or behavior may be operating on the port, and the hypothesis is tested by sending an interrogation packet that is expected to produce an expected action if the hypothesis is correct. In some embodiments, the expected action is detected and it is determined that the behavior/service of the hypothesis is operating. In some embodiments, by sending the interrogation packets, a malware that may otherwise lie dormant is activated to enable early detection of the malware before the malware is later undesirably activated to cause damage.

FIG. 1 is a block diagram illustrating an embodiment of a network environment. Interrogation node 102 is connected to nodes 114, 116, and 118 via network 122. For example, interrogation node 102 and nodes 114, 116, and 118 are a part of the same internal network (e.g., intranet). In some embodiments, it is desired to discover the existence of devices 114, 116, and 118 that are connected to network 122. In some embodiments, interrogation node 102 discovers listening services that are operating on nodes/devices of a network. For example, interrogation node 102 detects malware operating on one or more nodes of network 122. In some embodiments, malware detection and/or device/node discovery functionality of interrogation node 102 may be performed without requiring network nodes (e.g., nodes 114-118) to install specialized program/code for the functionality. For example, interrogation node 102 is added as a node (e.g., virtual appliance) of the network to be analyzed, and interrogation node 102 self-configures itself for the network and automatically discovers services/malware/nodes by querying nodes of the network.

Node 114 and node 116 belong to multicast group 115 and node 118 belongs to multicast group 119. For example, a single multicast packet sent to multicast group 115 will be delivered to both nodes 114 and 116. Interrogation node 102 includes components modulator 104, hunter 106, mapper 108 and sniffer 110. Modulator 104 attempts to discover nodes of network 112. For example, modulator 104 sends packets that require a response to be provided and tracks responses from nodes (e.g., nodes 114, 116, and 118) to identify the existence of the nodes. Hunter 106 port scans the nodes discovered by mapper 108. For example, hunter 106 discovers existence of listening services operating on ports of each node discovered by mapper 108. Modulator 104 attempts to identify a specific behavior and/or service/application operating on the ports discovered by hunter 106. Sniffer 110 receives and handles responses to packets sent by modulator 104, hunter 106, and/or mapper 108. For example, mapper 108 sends multiple packets successively without waiting for responses to the packets and the responses to the sent packets are received and handled by sniffer 110.

Interrogation node 102 is connected to database 112. Database 112 may include data associated with one or more of the following: discovered nodes of a network stored by mapper 108, ports with listening services discovered by hunter 106, behavior/service identified by modulator 104, hypothesis used by modulator 104 to identify behavior/service of a listening service, and a signature of a known behavior/service/malware. Remote server 120 is connected to interrogation node 102 and may provide node 102 with software updates, instructions, packets to be sent, and/or commands and may receive interrogation responses, analysis results, and/or operation information. For example, remote server 120 may be located external to an internal network (e.g., external to network 122) and may be used to remotely control and/or operate interrogation node 102. Interrogation node 102 may utilize other components connected to network 122 to perform one or more functions. For example, information may be obtained by node 102 from a network administrator and/or a Dynamic Host Configuration Protocol (i.e., DHCP) server.

Although the example of FIG. 1 shows interrogation node 102 directly connected to remote server 120 and database 112, in some embodiments, remote server 120 and/or database 112 is connected to network 122 and interrogation node 102 accesses remote server 120 and/or database 112 via network 122. In some embodiments, remote server 120 and/or database 112 is accessible via a public network such as the Internet and interrogation node 102 accesses remote server 120 and/or database 112 via the public network. Examples of nodes 114, 116, and 118 include a physical network device and a virtual network device. Examples of interrogation node 102 include a physical network device, a virtual network device, and a software component of a network node (e.g., a software component of a physical network device represented as node 114). In some embodiments, functionality of interrogation node 102 and one or more of its components is offered as Software-as-a-Service (i.e., SAAS), and interrogation node 102 allows services of remote server 120 to be accessed by one or more devices connected to network 122.

Examples of network 122 include one or more of the following: a direct or indirect physical communication connection, mobile communication network, a virtual network, Internet, intranet, Local Area Network, Wide Area Network, Storage Area Network, and any other form of connecting two or more systems, components, or storage devices together. In some embodiments, network 122 is an intranet network and network 122 allows access to an external network separated by a firewall. In various embodiments, the components shown in FIG. 1 may exist in various combinations of hardware machines. One or more of the components shown in FIG. 1 may be included in the same machine. Although the example of FIG. 1 shows modulator 104, hunter 106, mapper 108, and sniffer 110 included in interrogation node 102, these components may exists in one or more different hardware devices. Other communication paths may exist and the example of FIG. 1 has been simplified to illustrate the example clearly. Although single instances of components have been shown to simplify the diagram, additional instances of any of the components shown in FIG. 1 may exist. For example, multiple modulators, hunters, mappers, and sniffers may exist in interrogation node 102. Multiple interrogation nodes may exist. Other nodes may be connected to network 122. Multicast groups 115 and 119 may include other not shown in FIG. 1. Components not shown in FIG. 1 may also exist. For example, other types of devices may be connected to network 122.

Figure 2:
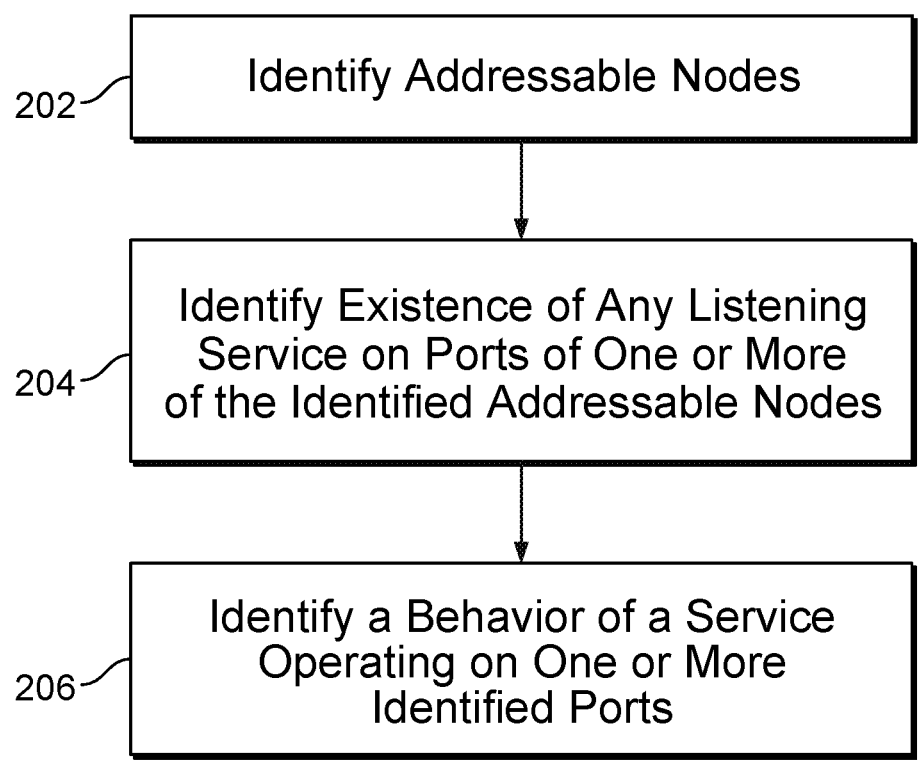
FIG. 2 is a flowchart illustrating a process for discovering nodes of a network.

FIG. 2 is a flowchart illustrating a process for discovering nodes of a network. The process of FIG. 2 may be at least in part implemented on interrogation node 102 and/or remote server 120 of FIG. 1.

At 202, addressable nodes are identified. In some embodiments, step 202 is performed at least in part by mapper 108 and/or sniffer 110 of FIG. 1. For example, response request packets are sent by mapper 108, and sniffer 110 receives responses to the response request packets. In some embodiments, determining the addressable nodes includes attempting to discover nodes that are connected to a network. For example, a listing of all discoverable devices/nodes connected to the network is attempted to be determined. In some embodiments, identifying the addressable nodes includes attempting to discover nodes connected to the network with an Internet Protocol (i.e., IP) address that belongs to the network. In some embodiments, identifying the addressable nodes includes identifying nodes that are confirmed to be addressable by an IP address associated with a network (e.g., discover nodes that are part of the same intranet). In some embodiments, identifying the addressable nodes includes providing a request for a response to one or more addresses of a network and receiving a reply that indicates that an addressable node exists at the address of the network. In some embodiments, identifying the addressable nodes includes determining nodes that are addressable by Internet Protocol version 4 (i.e., IPv4) addresses and/or IPv6 addresses. The addressable nodes may be identified continually and/or periodically. For example, nodes that belong to a network may dynamically change, and the changes are tracked by periodically identifying addressable nodes. In some embodiments, identifiers of the identified addressable nodes are stored. For example, IP addresses of the addressable nodes are stored in database 112 of FIG. 1.

At 204, existence of any listening service on ports of one or more of the identified addressable nodes is identified. In some embodiments, step 204 is performed at least in part by hunter 106 and/or sniffer 110 of FIG. 1. For example, port scanning packets are sent by hunter 106, and sniffer 110 receives responses to the port scanning packets. In some embodiments, identifying the existence of listening services includes port scanning each of the nodes identified at 202. For example, port scanning packets are sent to every port of each of the nodes identified at 202. In some embodiments, identifying the existence of the listening service includes identifying ports that are associated with a service that provides a response packet in response to a port scanning packet provided to the port. In some embodiments, port scanning is performed continually and/or periodically. For example, services operating on ports of a network node machine may dynamically change, and changes are tracked by periodically scanning the ports of the network node. In some embodiments, identifiers of identified ports with listening services are stored. For example, port numbers of the addressable nodes are stored in database 112 of FIG. 1.

At 206, a behavior of a service operating on one or more identified ports is identified. In some embodiments, the behavior of the service includes operation of the service. In some embodiments, step 206 is performed at least in part by modulator 104 and/or sniffer 110 of FIG. 1. For example, interrogation packets are sent by modulator 104, and sniffer 110 receives responses to the interrogation packets. In some embodiments, identifying the behavior of the service includes providing interrogation packets that invite a certain response that can be used to identify a specific behavior and/or service operating on a port. For example, in order to identify a specific behavior and/or service operating on a port identified in 204, a plurality of interrogation packets that correspond to a plurality of hypotheses are sent to the port. If an expected response is received in response to an interrogation packet, a specific behavior and/or specific service tested by the interrogation packet is determined to be potentially operating on the port. In some embodiments, a confidence indicator indicating a level/degree of confidence that the behavior/service determined to be potentially operating on the port is determined. In some embodiments, each port identified in 204 is analyzed at 206 by sending interrogation packets to the port. In some embodiments, if more than one expected action is detected from a port in response to more than one interrogation packet, a hierarchical ordering of identifiable behavior/service may be used to identify a single behavior and/or service operating on a port. For example, if it is determined that two different services may be operating on a port, a service with a higher hierarchy may be chosen as the service that is identified as being operating on the port. In some embodiments, if more than one expected action is detected from a port in response to more than one interrogation packet, a confidence indicator may be used to identify a single behavior and/or service operating on a port. For example, the identification with a higher confidence indicator is selected.

In some embodiments, the identification in 206 is performed continually and/or periodically. For example, services operating on ports of a network node may dynamically change, and identification of a behavior/service operating on the ports is updated. In some embodiments, the identification in 206 is performed dynamically when a port is identified in 204. In some embodiments, identifiers of identified behavior and/or service are stored. For example, behavior/service identifiers are stored in database 112 of FIG. 1. In some embodiments, a result of the identification in 206 is used to generate a table/listing of services operating on ports of network nodes of a network.

In some embodiments, a level/degree of threat the identified behavior/service is associated with a malware is determined. In some embodiments, an identified threat level/degree is stored in a data structure such as database 112 of FIG. 1. In some embodiments, if the behavior/service is potentially associated with a malware, an indication is provided. For example, if the determined level/degree of threat meets a threshold value, an alert is provided to a network administrator.

Figure 3:
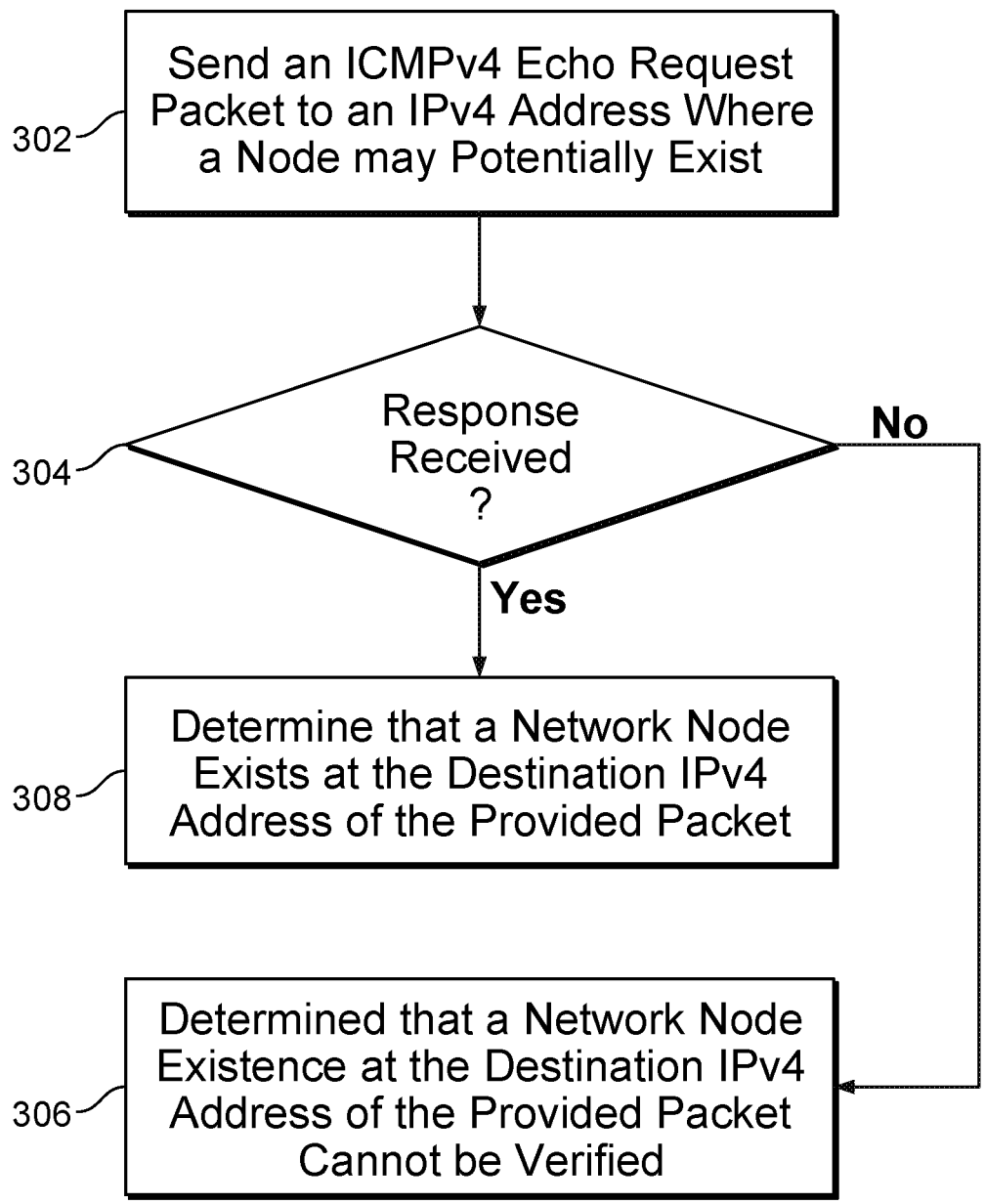
FIG. 3 is a flow chart illustrating a process for discovering IPv4 addressable nodes of a network.

FIG. 3 is a flow chart illustrating a process for discovering IPv4 addressable nodes of a network. The process of FIG. 3 may be at least in part implemented on interrogation node 102, remote server 120, mapper 108, and/or sniffer 110 of FIG. 1. In some embodiments, the process of FIG. 3 is included in 202 of FIG. 2.

At 302, an Internet Control Message Protocol version 4 (i.e., ICMPv4) echo request packet (e.g., ping request packet) is sent to an IPv4 address where a node may potentially exist. In some embodiments, the IPv4 address may be one of a plurality of IP addresses where the ICMPv4 echo request is sent. For example, each IP address in a range of IP addresses determined to be associated with a subject network to be analyzed is sent an ICMPv4 echo request packet.

At 304, it is determined whether a response has been received in response to the echo request packet. In some embodiments, determining whether the response has been received includes determining whether a response packet has been received from a node at the destination IPv4 address of the echo request packet. In some embodiments, a network node that receives an ICMPv4 echo request packet may provide a response but is not required to provide a response.

If it is determined at 304 that a response has not been received, at 306 it is determined that a network node existence at the destination IPv4 address of the provided packet cannot be verified. In some embodiments, if the determination at 306 is made, a determination is made that a network node likely does not exist at the destination IPv4 address. In some embodiments, if the determination at 306 is made, a determination is made that a network node may potentially exist at the destination IPv4 address and may be configured to intentionally not respond to the ICMPv4 echo request packet. For example, if the determination at 306 is made, the destination IPv4 address is identified/stored to indicate that further analysis (e.g., performed at 204 of FIG. 2) of a potential node located at the IPv4 address should be performed.

If it is determined at 304 that a response has been received, at 308 it is determined that a network node exists at the destination IPv4 address of the provided packet. In some embodiments, if the determination at 308 is made, the destination IPv4 address is identified/stored to indicate that further analysis (e.g., performed at 204 of FIG. 2) of the node located at the IPv4 address should be performed.

Figure 4:
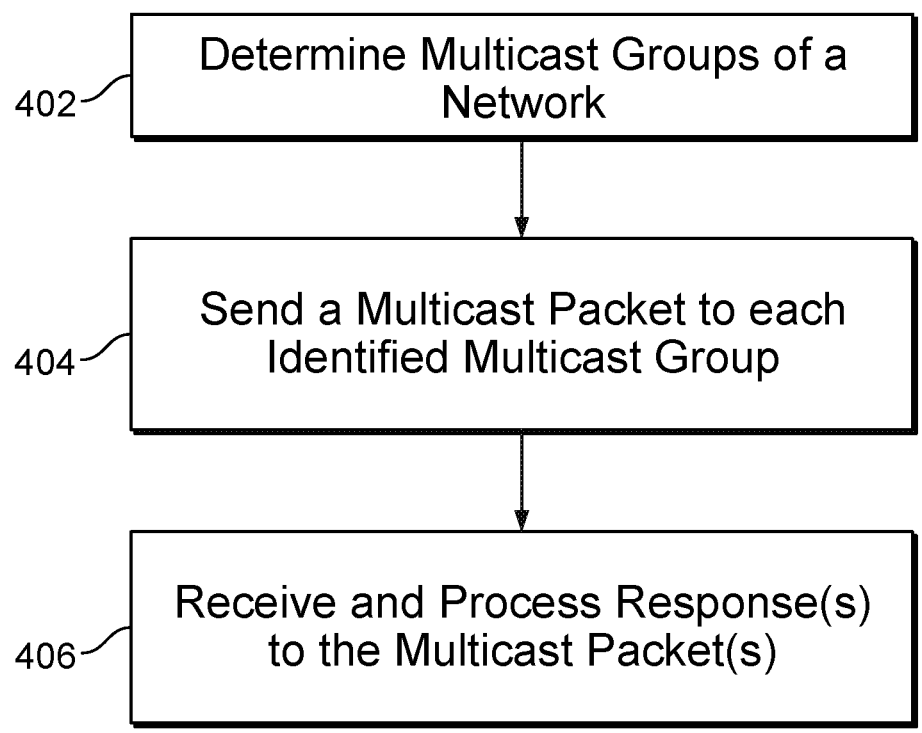
FIG. 4 is a flowchart illustrating a process for discovering IPv6 addressable nodes of a network.

FIG. 4 is a flowchart illustrating a process for discovering IPv6 addressable nodes of a network. The process of FIG. 4 may be at least in part implemented on interrogation node 102, remote server 120, mapper 108, and/or sniffer 110 of FIG. 1. In some embodiments, the process of FIG. 4 leverages a specific requirement of the IPv6 protocol standard that is not present and could not leverage with the IPv4 protocol. The process of FIG. 4 may allow IPv6 address space of a subject network to be mapped efficiently and completely. In some embodiments, the process of FIG. 4 is included in 202 of FIG. 2. In some embodiments, the process of FIG. 4 is used to discover nodes/devices of an IPv6 network to allow efficient management of the network. For example, the process of FIG. 4 is used to determine a list of nodes/devices connected to a network and the list is used to analyze network utilization and perform network planning.

At 402, multicast groups of a network are determined. For example, existence of multicast groups of a network such as group 115 and group 119 of network 122 in FIG. 1 is determined. In some embodiments, a multicast group includes a grouping of one or more addresses (e.g., IPv6 addresses) that have been grouped together for network management purposes. A communication (e.g., a packet) sent to a multicast group (e.g., sent to an identifier/address) may be provided to a plurality of member addresses belonging to the multicast group. In some embodiments, determining the multicast groups includes receiving an identification of multicast groups. For example, a network administrator provides a list of multicast groups of a network to be analyzed. In some embodiments, determining the multicast groups includes querying a Dynamic Host Configuration Protocol (i.e., DHCP) server and/or another network management server of the network to obtain an identification of the multicast groups of the network.

In some embodiments, if a listing of multicast groups of the network cannot be obtained from one or more sources, identification of the multicast groups is dynamically determined. For example, a multicast group identifier assigned to an interrogation node such as node 102 of FIG. 1 is used as an initial multicast group identifier and the initial multicast group identifier is iteratively incremented and decremented and verified for existence of a valid multicast group at the incremented/decremented identifier until bounding limits of a valid range of multicast group identifiers are found. For example, identifier/addresses (e.g., group number included in an address) of multicast groups may be numerically contiguous and the upper and lower bounds of the multicast group address range are determined by iteratively testing incremented/decremented multicast group addresses starting from an initially known to be valid multicast group address.

At 404, a multicast packet is sent to each identified multicast group. In some embodiments, the multicast packet is an IPv6 packet sent to a multicast group address. Because all nodes with an IPv6 address belong to a multicast group and the multicast packet sent in 404 will be distributed to all members of the multicast group, all nodes of a subject network may be reached by sending packets to all multicast groups. In some embodiments, the IPv6 packet specifies a required option that will not be recognized by a receiver of the packet. For example, the IPv6 packet includes one or more extension headers that encode optional internet-layer information. Each extension header may identify any number of options. The option may be specified in the extension header by an option type identifier (e.g., an 8-bit identifier of the type of option), an option data length identifier (e.g., an 8-bit integer identifying a length of option data), and an option data (e.g., a variable length field with data of the option).

The option type identifier of the option is encoded in a manner such that the highest order two bits specify an action that must be taken if the node processing of the IPv6 packet does not recognize the option type. If the highest order two bits are "00", then the option should be skipped over and the rest of the header should be processed. If the highest order two bits are "01", then the packet should be discarded. If the highest order two bits are "10," then the packet should be discarded, and regardless of whether or not the packet's Destination Address was a multicast address, an Internet Control Message Protocol version 6 (i.e., ICMPv6) Parameter Problem, Code 2, message is to be provided to the packet's Source Address, pointing to the unrecognized Option Type. If the highest order two bits are "01", it specifies that the packet should be discarded and only if the packet's Destination Address was a multicast address, an ICMPv6 Parameter Problem, Code 2, message is to be sent to the packet's Source Address, pointing to the unrecognized Option Type. In some embodiments, the multicast packet sent in 404 specifies an option type (e.g., highest order two bits are "10") that requires a message to be provided by a receiver of the packet if the option type cannot be recognized and the option type is known to be an invalid option type. For example, a multicast packet sent in 404 specifies an option type with the first highest order two bits that are "10" and the rest of the bits specify values that do not correspond to a valid option type. A receiver of this packet is required by the IPv6 protocol to provide an ICMPv6 Parameter Problem, Code 2, message. By tracking which node has provided this ICMPv6 message, nodes of an IPv6 network may be determined.

At 406, response(s) to the multicast packet(s) are received and processed. In some embodiments, the response includes an ICMPv6 message/packet that includes a header with a type field (e.g., 8-bit value specifying the type of the message) and a code field (e.g., 8 bit value that further specifies a sub-type of the identified type in the type field). In some embodiments, the multicast packet sent in 404 invites an ICMPv6 Parameter Problem, Code 2, response message (e.g., message with type field value "4" specifying a Parameter Problem message and a code field value "2" that specifies "unrecognized IPv6 option encountered" reason for the Parameter Problem message) from a node that received the multicast packet. In some embodiments, a response is expected from every valid node with an IPv6 address that received the multicast packet(s) sent to the multicast group(s). In some embodiments, based on at least in part on whether a response has been received from a node belonging to a particular multicast group, additional multicast group(s) to send the multicast packet is determined.

In some embodiments, starting from an initial multicast group number known to be valid (e.g., multicast group number belonging to a sender of the multicast packet), a multicast group number is iteratively incremented (e.g., to determine an upper bound of in a valid range of multicast group numbers) and used in destination multicast group addresses to be sent the multicast packet as long as the incremented group number is determined to be valid because a response has been received in response to the multicast packet sent to the address of the incremented group number. When a multicast packet sent to an incremented group number does not generate a response packet, an upper bound on the valid range of multicast groups may have been reached and the multicast group number is no longer iteratively incremented and used to send the multicast packet.

In some embodiments, starting from an initial multicast group number known to be valid (e.g., multicast group number belonging to a sender of the multicast packet), a multicast group number is iteratively decremented (e.g., to determine a lower bound of in a valid range of multicast group numbers) and used in destination multicast group addresses to be sent the multicast packet as long as the decremented group number has not reached zero and is determined to be valid because a response has been received in response to the multicast packet sent to the address of the decremented group number. When a multicast packet sent to a decremented group number does not generate a response packet, a lower bound on the valid range of multicast groups may have been reached and the multicast group number is no longer iteratively decremented and used to send the multicast packet.

In some embodiments, processing the response(s) to the multicast packet(s) includes storing an identifier of one or more nodes that provided the response(s). For example, an identifier of the node (e.g., IP address) is stored in a data structure such as database 112 of FIG. 1. The identifier may be used to identify which nodes exist in a network. In some embodiments, the identifier is used to identify a node to be analyzed at 204 of FIG. 2.

In some embodiments, processing the response(s) to the multicast packet(s) includes determining changes to nodes of a subject network. For example, the process of FIG. 4 is continually/periodically performed and any new node that is added to the network and/or any removed node since the last execution of the process of FIG. 4 is identified. In some embodiments, if a new node is detected, in order to detect unauthorized nodes on the network, it is determined whether the new node is authorized to be on the network. For example, the new node is analyzed to determine whether the new node is included in a whitelist of authorized nodes, is included in a blacklist of unauthorized nodes, can present an authorization (e.g., authorization token), is of a type that is authorized to access the network, and/or is associated with a valid user. By comparing an identification of a new node with an identification of a removed node, it may be determined that the new node is not actually a new node but merely moved within the network. For example, the node may have moved to a different network grouping because the node is now utilizing a different network access point. In some embodiments, if a previously existing node is no longer detected, it is determined whether the node has failed and/or a failover of the node is performed. For example, the node may be providing a networked service and when it is detected that the node is no longer a part of the network, the service being provided by the removed node is transferred to a different node of the network.

Figure 5:
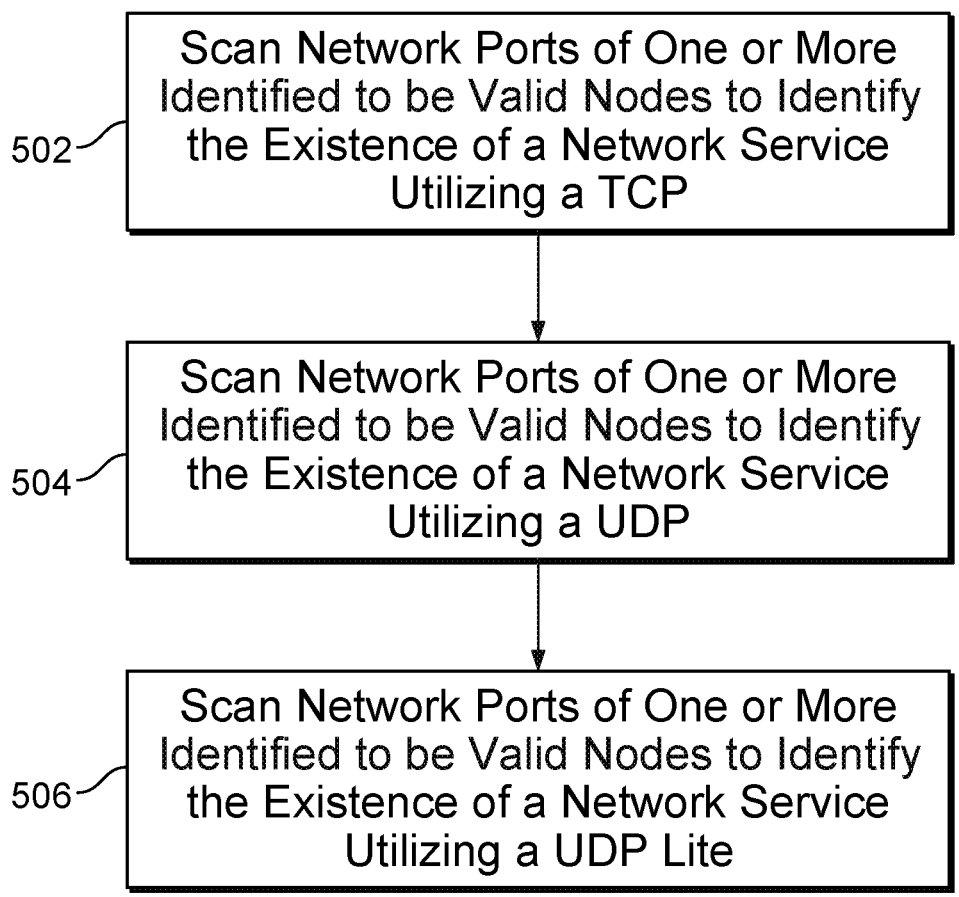
FIG. 5 is a flowchart illustrating an embodiment of a process for discovering the existence of listening services on ports of one or more of the identified addressable nodes.

FIG. 5 is a flowchart illustrating an embodiment of a process for discovering the existence of listening services on ports of one or more of the identified addressable nodes. The process of FIG. 5 may be at least in part implemented on interrogation node 102, remote server 120, hunter 106, and/or sniffer 110 of FIG. 1. In some embodiments, the process of FIG. 5 is included in 204 of FIG. 2. In some embodiments, the process of FIG. 5 includes port scanning one or more valid nodes identified at 202 of FIG. 2, the process of FIG. 3 and/or the process of FIG. 4.

At 502, network ports of one or more identified to be valid nodes are scanned to identify the existence of a network service utilizing a Transmission Control Protocol (i.e., TCP). In some embodiments, the identified to be valid nodes are nodes identified at 202 of FIG. 2, the process of FIG. 3 and/or the process of FIG. 4. In some embodiments, a TCP synchronize (i.e., "SYN") packet is sent to every TCP port of one or more identified to be valid node(s) to initiate a communication handshake. In response, for each port, the node may (1) provide a response that indicates no listening service exists on the port and the handshake cannot be initiated, (2) provide no response, or (3) provide a "SYN ACK" packet that indicates that a listening service exists on the port. In some embodiments, ports that provide either the "SYN ACK" packet or provide no response are identified (e.g., port identifier(s) are stored in a data structure such as database 112 of FIG. 1) for further examination (e.g., at 206 of FIG. 2).

At 504, network ports of one or more identified to be valid nodes are scanned to identify the existence of a network service utilizing a User Datagram Protocol (i.e., UDP). In some embodiments, the identified to be valid nodes are nodes identified at 202 of FIG. 2, the process of FIG. 3 and/or the process of FIG. 4. In some embodiments, a UDP packet is sent to every UDP port of one or more identified to be valid node(s). In response for each port, the node may (1) provide an ICMP packet response that indicates no listening service exists on the port and the port is unreachable, (2) provide no response, or (3) provide a confirmation response that indicates a listening service exists on the port. In some embodiments, ports that provide either a confirmation response packet or provide no response are identified (e.g., port identifier(s) are stored in a data structure such as database 112 of FIG. 1) for further examination (e.g., at 206 of FIG. 2).

At 506, network ports of one or more identified to be valid nodes are scanned to identify the existence of a network service utilizing a User Datagram Protocol Lite (i.e., UDP Lite). In some embodiments, the identified to be valid nodes are nodes identified at 202 of FIG. 2, the process of FIG. 3 and/or the process of FIG. 4. In some embodiments, a UDP Lite packet is sent to every UDP Lite port of one or more identified to be valid node(s). In response for each port, the node may (1) provide an error response that indicates no listening service exists on the port and the port is unreachable, (2) provide no response, or (3) provide a confirmation response that indicates a listening service exists on the port. In some embodiments, ports that provide either a confirmation response packet or provide no response are identified (e.g., port identifier(s) are stored in a data structure such as database 112 of FIG. 1) for further examination (e.g., at 206 of FIG. 2).

In some embodiments, at least a portion of the process of FIG. 5 is performed continually and/or periodically. For example, services operating on ports of a network node machine may dynamically change and changes are tracked by periodically scanning the ports of the network node.

Figure 6:
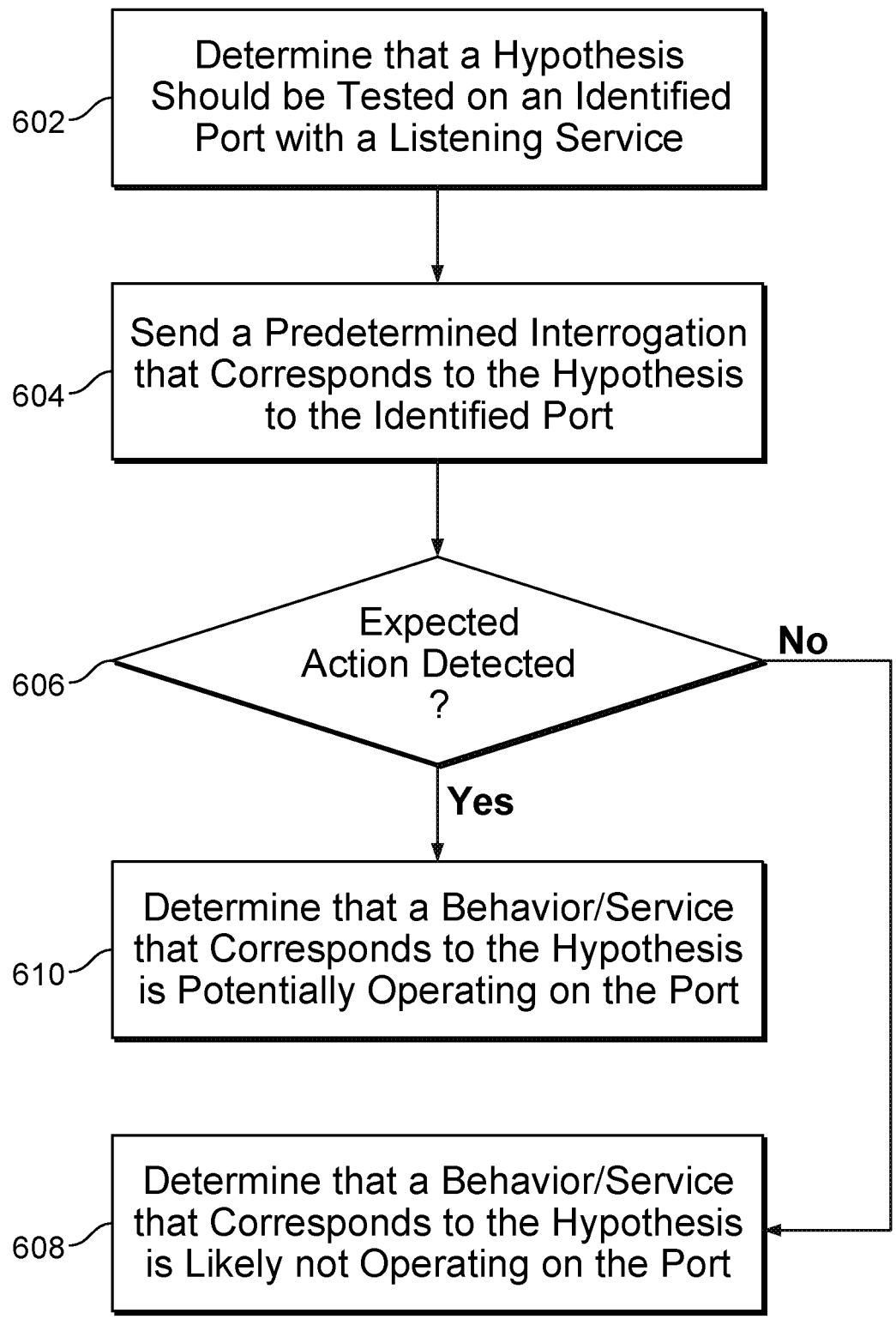
FIG. 6 is a flowchart illustrating an embodiment of a process for identifying a behavior of a service operating on one or more identified ports.

FIG. 6 is a flowchart illustrating an embodiment of a process for identifying a behavior of a service operating on one or more identified ports. The process of FIG. 6 may be at least in part implemented on interrogation node 102, remote server 120, modulator 104, and/or sniffer 110 of FIG. 1. In some embodiments, the process of FIG. 6 is included in 206 of FIG. 2. In some embodiments, the process of FIG. 6 includes analyzing one or more ports identified at 204 of FIG. 2 and/or identified using the process of FIG. 5. In some embodiments, the process of FIG. 6 is performed for each hypothesis for each port of each node being analyzed. For example, there exists a plurality of hypotheses to be tested and each hypothesis is tested, if applicable, on each port (e.g., ports determined using the process of FIG. 5) of each node (e.g., nodes determined using the process of FIG. 3 and/or FIG. 4).

At 602, it is determined that a hypothesis should be tested on an identified port with a listening service. In some embodiments, the identified port is a port identified at 204 of FIG. 2 and/or identified using the process of FIG. 5. In some embodiments, the hypothesis is associated with a specific behavior (e.g., proxy) and/or specific service (e.g., specific malware service) that could be operating on a port and desired to be tested to determine whether the specific behavior/service is operating on the port. For example, a hypothesis is associated with a HTTP service and testing the hypothesis includes determining whether the HTTP service is operating on the port being analyzed. A second hypothesis may be associated with a "Zeus" malware service and testing the second hypothesis includes determining whether the "Zeus" malware service is likely operating on the port being tested. In some embodiments, testing the hypothesis includes attempting to initiate communication with the identified port to determine whether a specific behavior/service identified by the hypothesis is operating on the identified port. For example, a packet is set to the identified port to determine whether a communication library being utilized on the port responds in an expected manner indicative of the specific behavior/service of the hypothesis. In some embodiments, the identified port has been identified using the process of FIG. 5.

In some embodiments, determining that the hypothesis should be tested includes determining that the identified port is compatible with the hypothesis In some embodiments, determining that the hypothesis should be tested includes determining that the identified port utilizes a protocol that is compatible with the hypothesis. For example, a behavior/service associated with the hypothesis is only compatible with a certain protocol (e.g., UDP), and the hypothesis only should be tested if the identified port utilizes the protocol (e.g., must be a UDP port). In some embodiments, determining that the hypothesis should be tested includes determining that the identified port matches a port number that is compatible with the hypothesis. For example, a behavior/service associated with the hypothesis is only compatible with a certain port number (e.g., HTTP port 80), and the hypothesis only should be tested if the identified port is a compatible port number. In some embodiments, if is determined that the hypothesis should not be tested, the process ends.

In some embodiments, the hypothesis tests whether the port is operating an HTTP service. In some embodiments, the hypothesis tests whether the port is operating a Bonjour service. In some embodiments, the hypothesis tests whether the port is operating a BitTorrent service. In some embodiments, the hypothesis tests whether the port is operating a malware service. In some embodiments, the hypothesis tests whether the port is operating a "Zeus" malware service. In some embodiments, the hypothesis tests whether the port is operating a "Zeus" communication library. In some embodiments, the hypothesis tests whether the port is operating a "zero access" malware service. In some embodiments, the hypothesis tests whether the port is operating a "Padobot" malware service. In some embodiments, the hypothesis tests whether the port is operating a proxying service. In some embodiments, the hypothesis tests whether the port is operating a port knocking behavior. In some embodiments, the hypothesis tests whether the port is operating a dynamic reverse shell behavior. In some embodiments, the hypothesis tests whether the port is operating a port hopping behavior.

At 604, a predetermined interrogation that corresponds to the hypothesis is sent to the identified port. In some embodiments, one or more predetermined interrogation packets are sent to the identified port. In some embodiments, the predetermined interrogation packet invites a response that corresponds to the specific behavior and/or service being tested by the hypothesis. For example, the predetermined interrogation packet invites a response that identifies the communication library being utilized by the port, and the communication library being utilized is indicative of whether the specific behavior and/or service is operating on the port. In some embodiments, the hypothesis tests whether the port is operating an HTTP service by sending an HTTP request packet to the identified port. In some embodiments, to test whether the port is operating an HTTP service, the interrogation packet is an HTTP request packet. In some embodiments, to test whether the port is operating a malware service, the interrogation packet is a packet that elicits a communication from the malware service. In some embodiments, the interrogation packet includes a token/key/data that wakes/unlocks a behavior of a service operation on the identified port. For example, a malware operating on the port only becomes active when a "magic token" is provided and this token is provided.

In some embodiments, to detect whether a proxy service is being operated on the port, a packet that requests it to be forwarded to the sender of the packet is the predetermined interrogation packet. If the packet is bounded back to the sender, then it may be determined that a proxy service is operating on the port.

In some embodiments, sending the predetermined interrogation packet includes sending more than one packet. For example, a service operating on the identified port is utilizing port knocking and in order to invoke the service, a first packet (e.g., specific UDP packet) must be provided to the identified port that causes another listening service to become active on a different port (e.g., TCP port associated with identified UDP port). More than one packet may be sent to the same port number and/or different port numbers. In some embodiments, the hypothesis specifies which packets to send to which ports.

At 606 it is determined whether an expected action is detected. In some embodiments, the expected action is indicative of whether the port is operating the behavior/service being tested with the hypothesis. In some embodiments, the expected action is identified by the hypothesis. In some embodiments, detecting the expected action includes detecting whether a response responsive to the predetermined interrogation packet has been received. In some embodiments, determining whether the expected action is detected includes analyzing contents of a response provided in response to the interrogation packet to determine whether it includes an expected content.

If at 606 it is determined that the expected action is not detected, at 608 it is determined that a behavior/service that corresponds to the hypothesis is likely not operating on the port.

If at 606 it is determined that the expected action is detected, at 610 it is determined that a behavior/service that corresponds to the hypothesis is potentially operating on the port. In some embodiments, a confidence indicator indicating a level/degree of confidence that the behavior/service determined to be potentially operating on the port is determined. In some embodiments, this determination is recorded in a data structure identifying a service/behavior operating on ports (e.g., ports identified using the process of FIG. 5) of a node (e.g., nodes identified using the processes of FIGS. 3 and/or 4). In some embodiments, even though it is determined that the behavior/service that corresponds to the hypothesis is potentially operating on the port, other hypotheses may be tested on the port to determine whether additional and/or other behavior/service is being operated on the identified port. For example, a "padobot" malware operating on a port may be identified as both an HTTP service and a "padobot" service because the "padobot" service utilizes the communication library of a typical HTTP service. The "padobot" service may be identified as the single service operating on the port because the identification of the "padobot" service is higher ranked (e.g., higher ranked in a predetermined hierarchy) and determined with a higher determined confidence identifier than the identification of the HTTP service.

Figure 7:
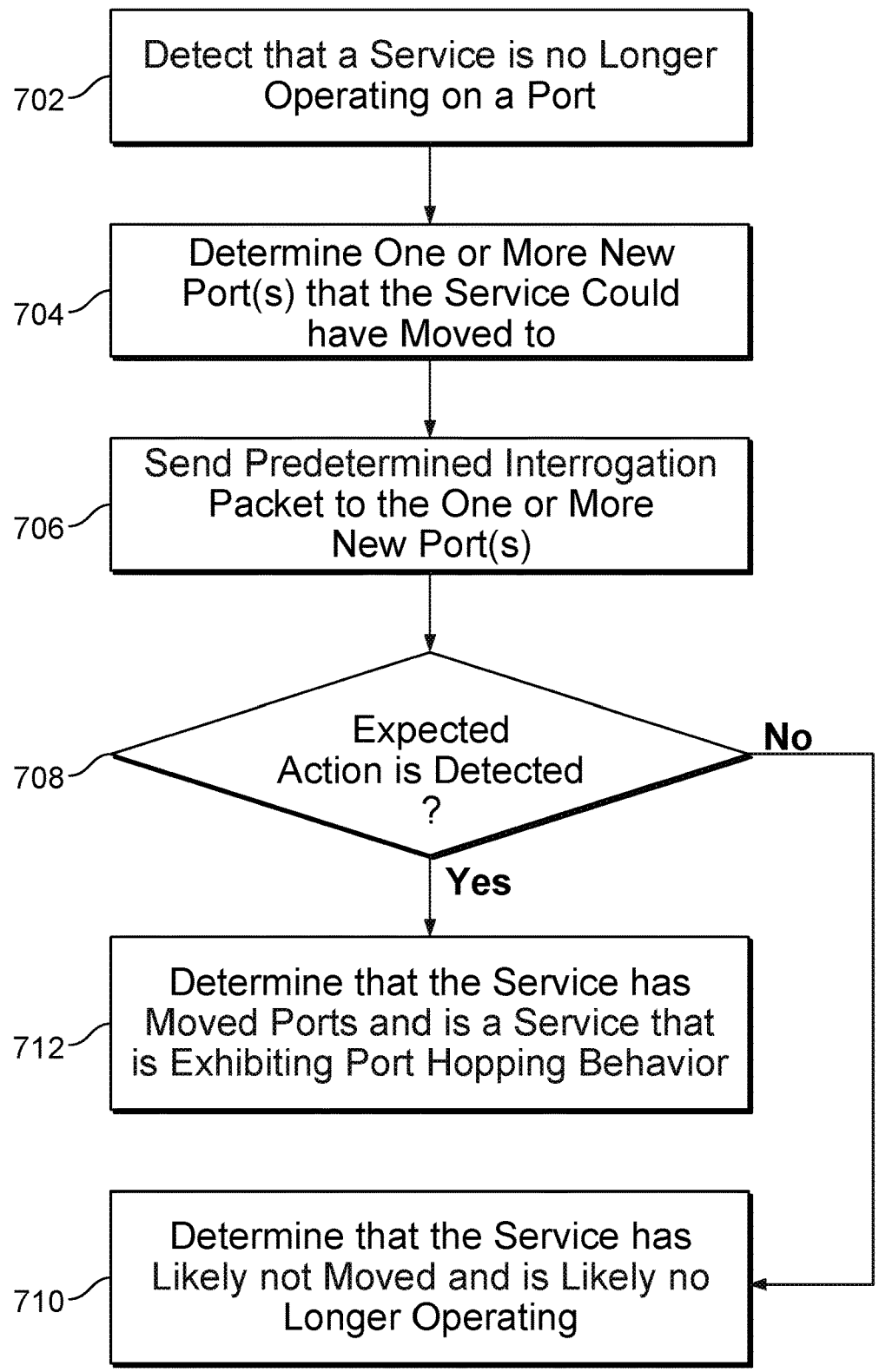
FIG. 7 is a flowchart illustrating an embodiment of a process for determining whether port hopping is being utilized on a port.

FIG. 7 is a flowchart illustrating an embodiment of a process for determining whether port hopping is being utilized on a port. The process of FIG. 7 may be at least in part implemented on interrogation node 102, remote server 120, modulator 104, and/or sniffer 110 of FIG. 1. In some embodiments, the process of FIG. 7 is included in 206 of FIG. 2. In some embodiments, the process of FIG. 7 includes analyzing one or more ports identified at 204 of FIG. 2 and/or identified using the process of FIG. 5. In some embodiments, port hopping refers to a behavior of a service that changes its operating communication port to avoid detection.

At 702, it is detected that a service is no longer operating on a port. In some embodiments, the service was detected that it was operating on the port using the process of FIG. 5 and/or FIG. 6. For example, the process of FIGS. 5 and/or 6 is periodically repeated to discover changes to services operating on ports of a node. The port may no longer have an operating listening service or the port may be operating a different service as compared to a previously determined service of the port.

At 704, one or more new port(s) that the service could have moved to is determined. In some embodiments, the new port is a next sequential port number (e.g., incremental or decremental) from the previous port number. In some embodiments, the new port number could be a pseudo random port number. A hypothesis is made as to which random generator seed (e.g., seed utilized by a known port hopping service) and random generator function (e.g., standard system random generator function) may have been utilized, and the determined seed and function are utilized to determine the new port number. In some embodiments, more than one potential new port number may be determined.

At 706, a predetermined interrogation packet is sent to the one or more new port(s). In some embodiments, the predetermined interrogation packet invites a response that corresponds to whether the service has moved ports. For example, the same interrogation packet that was used to previously identify the service is set to the new port(s).

At 708, it is determined whether an expected action is detected. In some embodiments, the expected action is indicative of whether the new port is operating the service that is no longer operating on the old port. In some embodiments, detecting the expected action includes detecting whether a response responsive to the predetermined interrogation packet has been received. In some embodiments, determining whether the expected action is detected includes analyzing contents of a response provided in response to the interrogation packet to determine whether it includes an expected content.

If at 708 it is determined that the expected action is not detected, at 710 it is determined that the service has likely not moved and is likely no longer operating.

If at 708 it is determined that the expected action is detected, at 712 it is determined that the service has moved ports and is a service that is exhibiting port hopping behavior. In some embodiments, this determination is recorded/updated in a data structure identifying a service/behavior operating on ports (e.g., ports identified using the process of FIG. 5) of a node (e.g., nodes identified using the processes of FIGS. 3 and/or 4).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for identifying a behavior of a malware service, comprising:

scanning a network communication port of a receiver, wherein a communication protocol operating on the network communication port is determined using a result of the scan;

sending to the network communication port of the receiver an interrogation packet that corresponds to a malware service, wherein the interrogation packet has been selected based at least in part on the communication protocol operating on the network, the interrogation packet is one of a plurality of interrogation packets sent to the network communication port and the predetermined interrogation packet invites an expected action that, when detected, at least in part confirms that a behavior of the malware service is operating;

using a processor to detect the expected action; and based at least in part in detecting the expected action, determining that the malware service is potentially is operating on the network communication port as indicated by a confidence level indicator that indicates a level of confidence that the malware service is potentially operating on the network communication port;

wherein the method further comprises one or more of the following:

(1) confirming that the behavior of the malware service is operating including by confirming that a proxy service is operating on the network communication port;

(2) confirming that the behavior of the malware service is operating including by confirming that a dynamic reverse shell is operating on the network communication port; and (3) sending to a second communication port of the receiver, a second interrogation packet that corresponds to the same malware service, wherein the initial interrogation packet causes a listening service to become active on the second communication port.

2. The method of claim 1, wherein the result of the scan identifies that a listening service is operating on the network communication port.

3. The method of claim 2, wherein scanning the receiver includes scanning ports of the receiver to identify the existence of the listening service utilizing a User Datagram Protocol Lite.

4. The method of claim 1, wherein the receiver was identified by sending to a multicast group of the receiver an Internet Protocol version 6 multicast packet that required the receiver to provide a response packet.

5. The method of claim 1, wherein the interrogation packet was sent in response to a discovery that the network communications port is operating a listening service.

6. The method of claim 1, wherein the behavior of the malware service includes an existence of the service.

7. The method of claim 1, wherein the interrogation packet has been selected to be tested on the network communication port at least in part due to a determination that the network communication port is compatible with the interrogation packet.

8. The method of claim 1, wherein the interrogation packet has been selected to be tested on the network communication port at least in part due to a determination that the protocol of the network communication port is compatible with the interrogation packet.

9. The method of claim 1, wherein detecting the expected action includes analyzing a response provided by the receiver of the interrogation packet.

10. The method of claim 1, wherein the interrogation packet includes a token that enables the behavior of the service.

11. The method of claim 1, wherein the network communication port of the interrogation packet was determined using a determination that the malware service was no longer operating on a previous network communication port and the network communication port is based on the previous network communication port.

12. The method of claim 1, wherein the network communication port was determined using a random generator seed specified by the hypothesis.

13. The method of claim 1, wherein detecting the expected action includes detecting that a communication library associated with the malware service is operational on the port.

14. A system for identifying a behavior of a malware service, comprising:
a communication interface configured to:
scan a network communication port of a receiver, wherein a communication protocol operating on the network communication port is determined using a result of the scan; and
send to the network communication port of the receiver an interrogation packet that corresponds to a malware service, wherein the interrogation packet has been selected based at least in part on the communication protocol operating on the network, the interrogation packet is one of a plurality of interrogation packets sent to the network communication port and the predetermined interrogation packet invites an expected action that, when detected, at least in part confirms that a behavior of the malware service is operating; and
a hardware processor coupled with the communication interface and configured to:
detect the expected action; and
based at least in part in detecting the expected action, determine that the malware service is potentially is operating on the network communication port as indicated by a confidence level indicator that indicates a level of confidence that the malware service is potentially operating on the network communication port;
wherein the processor is further configured to perform one or more of the following:
(1) confirm that the behavior of the malware service is operating including by being configured to confirm that a proxy service is operating on the network communication port;
(2) confirm that the behavior of the malware service is operating including by being configured to confirm that a dynamic reverse shell is operating on the network communication port; and
(3) send to a second communication port of the receiver, a second interrogation packet that corresponds to the same malware service, wherein the initial interrogation packet causes a listening service to become active on the second communication port.

15. The system of claim 14, wherein the result of the scan identifies that a listening service is operating on the network communication port.

16. The system of claim 15, wherein scanning the receiver includes scanning ports of the receiver to identify the existence of the listening service utilizing a User Datagram Protocol Lite.

17. The system of claim 14, wherein the interrogation packet was sent in response to a discovery that the network communications port is operating a listening service.

18. The system of claim 14, wherein the interrogation packet has been selected to be tested on the network communication port at least in part due to a determination that the network communication port is compatible with the interrogation packet.

19. The system of claim 14, wherein detecting the expected action includes analyzing a response provided by the receiver of the interrogation packet.

20. The system of claim 14, wherein the interrogation packet includes a token that enables the behavior of the service.

21. The system of claim 14, wherein the receiver was identified by sending to a multicast group of the receiver an Internet Protocol version 6 multicast packet that required the receiver to provide a response packet.

22. The system of claim 14, wherein the behavior of the malware service includes an existence of the service.

23. The system of claim 14, wherein the interrogation packet has been selected to be tested on the network communication port at least in part due to a determination that the protocol of the network communication port is compatible with the interrogation packet.

24. The system of claim 14, wherein the network communication port of the interrogation packet was determined using a determination that the malware service was no longer operating on a previous network communication port and the network communication port is based on the previous network communication port.

25. The system of claim 14, wherein the network communication port was determined using a random generator seed specified by the hypothesis.

26. The system of claim 14, wherein detecting the expected action includes detecting that a communication library associated with the malware service is operational on the port.

27. A computer program product for identifying a behavior of a malware service, the computer program product being embodied in a non-transitory computer readable storage medium and comprising computer instructions for:
scanning a network communication port of a receiver, wherein a communication protocol operating on the network communication port is determined using a result of the scan;
sending to the network communication port of the receiver an interrogation packet that corresponds to a malware service, wherein the interrogation packet has been selected based at least in part on the communication protocol operating on the network, the interrogation packet is one of a plurality of interrogation packets sent to the network communication port and the predetermined interrogation packet invites an expected action that, when detected, at least in part confirms that a behavior of the malware service is operating;
detecting the expected action; and
based at least in part in detecting the expected action, determining that the malware service is potentially is operating on the network communication port as indicated by a confidence level indicator that indicates a level of confidence that the malware service is potentially operating on the network communication port;

wherein the method further comprises one or more of the following:
- (1) confirming that the behavior of the malware service is operating including by confirming that a proxy service is operating on the network communication port;
- (2) confirming that the behavior of the malware service is operating including by confirming that a dynamic reverse shell is operating on the network communication port; and
- (3) sending to a second communication port of the receiver, a second interrogation packet that corresponds to the same malware service, wherein the initial interrogation packet causes a listening service to become active on the second communication port.

28. The computer program product of claim 27, wherein the result of the scan identifies that a listening service is operating on the network communication port.

29. The computer program product of claim 27, wherein the interrogation packet was sent in response to a discovery that the network communications port is operating a listening service.

30. The computer program product of claim 27, wherein the interrogation packet has been selected to be tested on the network communication port at least in part due to a determination that the network communication port is compatible with the interrogation packet.

31. The computer program product of claim 27, wherein detecting the expected action includes analyzing a response provided by the receiver of the interrogation packet.

32. The computer program product of claim 27, wherein the interrogation packet includes a token that enables the behavior of the service.

* * * * *